United States Patent [19]
Smith

[11] 3,727,388
[45] Apr. 17, 1973

[54] GRAPE HARVESTER

[76] Inventor: Leslie V. Smith, 112 North 22nd Avenue, Yakima, Wash.

[22] Filed: Aug. 16, 1971

[21] Appl. No.: 171,830

[52] U.S. Cl. ..............................................56/330
[51] Int. Cl. ..............................................A01g 19/00
[58] Field of Search..............................56/328–330

[56] References Cited

UNITED STATES PATENTS

| | | |
|---|---|---|
| 3,126,692 | 3/1964 | Weygandt et al.......................56/330 |
| 3,203,159 | 8/1965 | Weygandt et al...................56/330 X |
| 3,360,913 | 1/1968 | Burton ...................................56/330 |
| 3,380,236 | 4/1968 | Shepardson...........................56/330 |
| 3,439,478 | 4/1969 | Orton ................................56/330 X |
| 3,611,689 | 10/1971 | Patzlaff.................................56/330 |
| 3,636,688 | 1/1972 | Fontan ...................................56/330 |
| 3,522,696 | 8/1970 | Miller et al. .........................56/328 R |
| 3,389,543 | 6/1968 | Clark...................................56/328 R |
| 3,439,482 | 4/1969 | Orton.....................................56/330 |

FOREIGN PATENTS OR APPLICATIONS

| | | |
|---|---|---|
| 1,222,938 | 2/1971 | Great Britain...........................56/330 |

*Primary Examiner*—Hugh R. Chamblee
*Assistant Examiner*—J. A. Oliff
*Attorney*—John W. Kraft

[57] ABSTRACT

The harvester of this invention comprises a substantially U-shaped inverted framework carried by a pair of wheels mounted on axles disposed at the opposite terminal sides of the framework; an entranceway including a pair of opposing substantially V-shaped guide walls, inwardly projecting with respect to the direction of travel, depending from the framework and being disposed in the entranceway of the harvester; a pair of rectilinearly extending opposing flexible collector floor portions being coextensive in length with the framework, each collector issuing upwardly at an angle toward the centermost portion of the harvester and being engageable with vines planted in rows; and a multiplicity of vine engaging shaker panel assemblies disposed vertically with respect to the ground, one panel being mounted above another panel, each of the panels including a plurality of opposing pairs of shaker rods carried in brackets operable to oscillate transversely in unison to move a portion of the vine being harvested in one direction while the next succeeding shaker panel moves the portion of the vine in a direction opposite.

2 Claims, 5 Drawing Figures

LESLIE V. SMITH INVENTOR

LESLIE V. SMITH  INVENTOR.

LESLIE V. SMITH  INVENTOR.

GRAPE HARVESTER

FIELD OF INVENTION

The present invention relates to harvesters for grapes, berries and the like grown on vines planted in parallel rows on arbors, and more particularly harvesters operable to grasp and shake the vines to dislodge fruit therefrom without damage to foliage and vines.

BRIEF DESCRIPTION OF THE PRIOR ART

Harvesters for grapes, berries and the like formerly known in the art generally comprise two general types; namely, harvesters having vertically reciprocating bars operable to "slap" or beat vines to dislodge fruit therefrom, and harvesters having a multiplicity of rectilinearly disposed vibrating units operable to successively shake the vines in a fish-tailing-like action to dislodge fruit. Each of these types of harvesters tend to bruise and to break the vines, the foliage, and the fruit in operation, and to collect foliage debris in the harvesting process. Thereafter, unwanted debris and damaged fruit must be separated from the harvested fruit. Harvesters generally known are complex machines usually requiring much maintenance.

Accordingly it is an object of the present invention to provide means in a harvesting machine operable to grasp and to shake the vines to dislodge fruit, tending thereby to avoid damage to the growing vines.

A further object of the present invention is to provide a harvester of simple design, structure, and inexpensive in cost.

These and other objects shall become apparent from the description following, it being understood that modifications may be made without affecting the teachings of the invention here set out.

SUMMARY OF THE INVENTION

Generally the harvester of this invention comprises a substantially U-shaped inverted framework carried by a pair of wheels mounted on axles disposed at the opposite terminal sides of the framework; an entranceway including a pair of opposing substantially V-shaped guide walls, inwardly projecting with respect to the direction of travel, depending from the framework and being disposed in the entranceway of the harvester; a pair of rectilinearly extending opposing flexible collector floor portions being coextensive in length with the framework, each collector issuing upwardly at an angle toward the centermost portion of the harvester and being engageable with vines planted in rows; and a multiplicity of vine engaging shaker panel assemblies disposed vertically with respect to the ground, one panel being mounted above another panel, each of the panels including a plurality of opposing pairs of shaker rods carried in brackets operable to oscillate transversely in unison to move a portion of the vine being harvested in one direction while the next succeeding shaker panel moves the portion of the vine in a direction opposite.

A more thorough and comprehensive understanding may be had from the detailed description of the preferred embodiment when read in connection with the drawings forming a part of this specification.

DESCRIPTION OF THE PREFERRED EMBODIMENT

Figure 1:
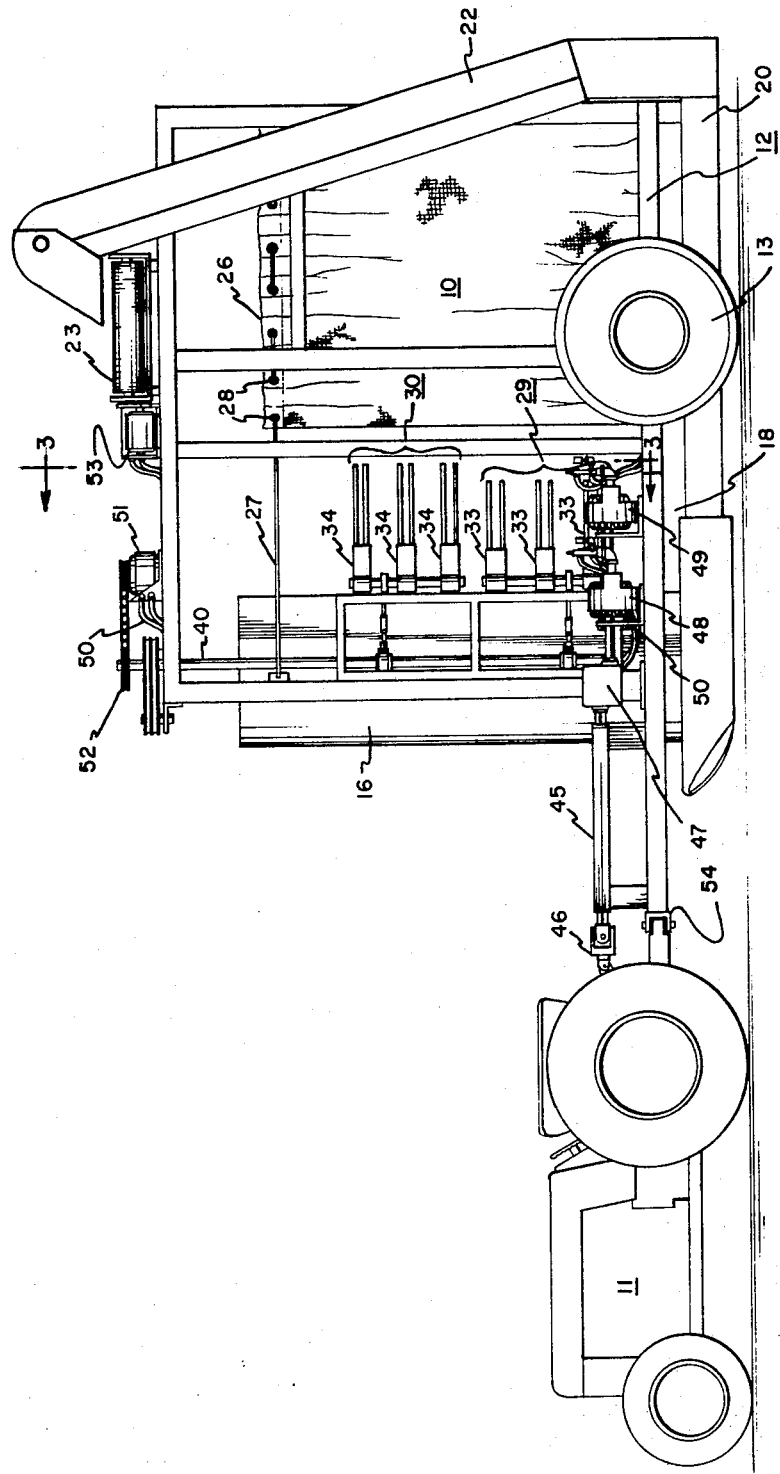
FIG. 1 is a side elevational view of the grape harvester of the present invention showing to advantage the harvester in the environment of a tractor operable to tow the harvester.
Figure 2:
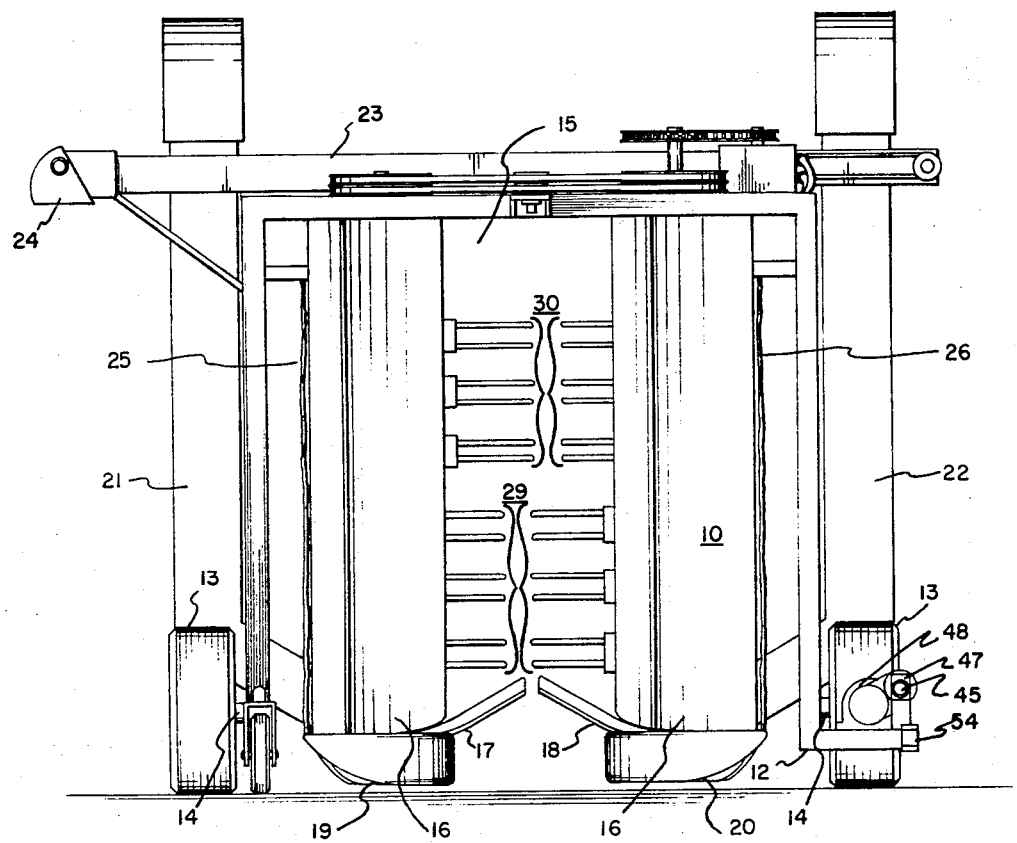
FIG. 2 is a front elevational view of the invention as viewed from the direction of travel of the harvester showing to advantage a substantially U-shaped inverted framework carried by a pair of wheels mounted on axles disposed at the opposite terminal sides of the framework; an entranceway including a pair of opposing substantially V-shaped guide walls, inwardly projecting with respect to the direction of travel, depending from the framework and being disposed in the entranceway of the harvester; a pair of rectilinearly extending opposing flexible collector floor portions, being coextensive in length with the framework, each collector issuing upwardly at an angle toward the centermost portion of the harvester and being engageable with vines planted in rows; and a multiplicity of vine engaging shaker panel assemblies disposed vertically with respect to the ground, one panel being mounted above another panel, each of the panels including a plurality of opposing pairs of shaker rods carried in brackets operable to oscillate transversely in unison to move a portion of the vine being harvested in one direction while the succeeding shaker panel moves the portion of the vine in a direction opposite.

Referring now to the drawings and more particularly to the FIGS. 1 and 2, the grape harvester of this invention is generally shown and identified by the numeral 10. While it is to be understood that the harvester 10 may be a self-propelled, dirigible unit using and employing any of a variety of motive driving and steering assemblies commonly known in the art, the harvester 10 is here shown and described in the environment of a commonly known tractor 11.

The harvester 10 includes a substantially U-shaped inverted framework 12 carried by a pair of opposing wheels 13 journaled for rotation on respective axles 14 suitably fastened to the opposite sides of the framework 12. An entranceway 15 is provided at the forwardmost portion of the framework 12 and includes a pair of opposing, substantially V-shaped, upstanding guide walls 16 projecting inwardly with respect to the direction of travel of the harvester 10 and depending downwardly from the framework 12. The walls 16 are operable to guide vines planted in rows into the harvester 10 as the harvester is moved rectilinearly astride the rows of vines to be harvested. A pair of rectilinearly extending opposing flexible collector floor portions 17 and 18 coextensive in length with framework 12 are provided adjacent the ground over which the harvester 10 travels. The collector floor portions 17 and 18 issue upwardly at an angle toward the centermost portion of the harvester 10 and are operable to engage the trunk portion of a vine near the ground. The portions 17 and 18 tend to close about the vine trunk as the harvester 10 is moved rectilinearly with the row of vines to be harvested. A pair of conveyors 19 and 20 are mounted on the opposite sides of the framework 12 adjacent the terminal edge of the respective collector floor portions 17 and 18. The conveyors 19 and 20 are coextensive in length with the framework 12 and are driven rectilinearly rearwardly with respect to the direction of travel of the harvester 10 by suitable drive assemblies (not shown) commonly known in the art. A pair of elevating conveyors 21 and 22 suitably mounted on the opposite side of the framework 12 are provided at the rearwardmost terminal ends of the respective conveyors 19 and 20. In practice, grapes, berries, and the like harvested from vines by the harvester 10, as hereinafter later described, tend to fall on the respective inclined collector floor portions 17 and 18 and to slide by gravity into the respective rearwardly moving conveyors 19 and 20. The harvested fruit is carried rearwardly by the conveyors 19 and 20 to the respective elevating conveyors 21 and 22. A cross conveyor 23 is mounted transversely in the framework 12 at the uppermost portion of the framework 12. The cross conveyor 23 is distally disposed below the uppermost terminal end of the elevating conveyors 21 and 22. An unloading chute 24 is suitably mounted at one of the terminal ends of the cross conveyor 23. In practice fruit elevated by the respective elevating conveyors 21 and 22 is discharged onto the cross conveyor 23 and carried by the conveyor 23 toward the chute 24 to be discharged into a truck traveling between the rows of vines adjacent the harvester 10. It has been found to advantage to suspend curtains 25 and 26 on the opposite sides of the framework 12 to contain harvested fruit within the harvester 10. The curtains 25 and 26 may be carried on respective cables 27 and 27' by a plurality of grommets 28 distally disposed in the uppermost terminal edge portion of the respective curtains 25 and 26.

Figure 3:
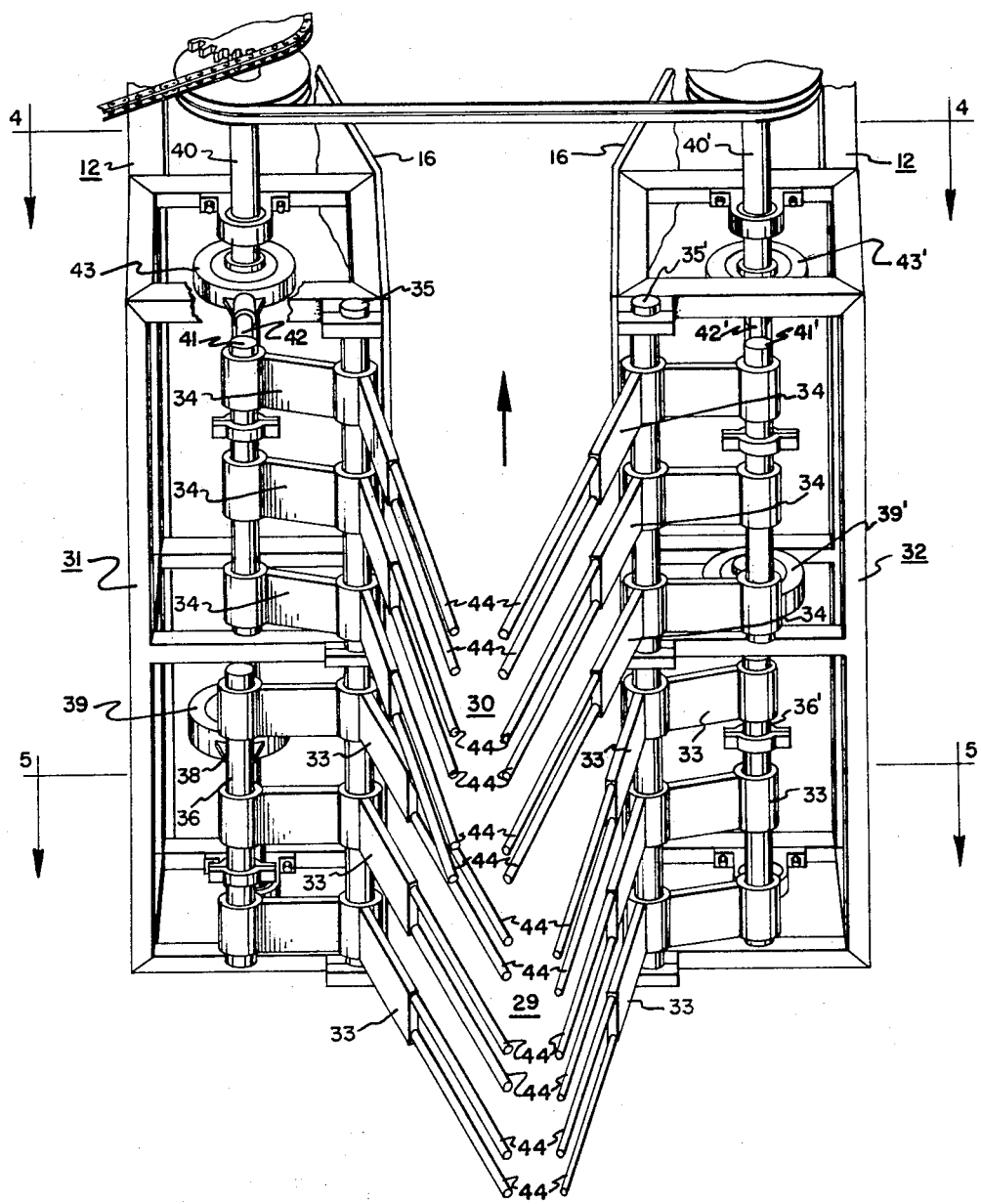
FIG. 3 is a fragmentary perspective view of a multiplicity of shaker panel assemblies mounted in the framework drawn to a larger scale as viewed from the side opposite the direction of travel of the harvester taken substantially along the lines 3—3 of the FIG. 1.
Figure 4:
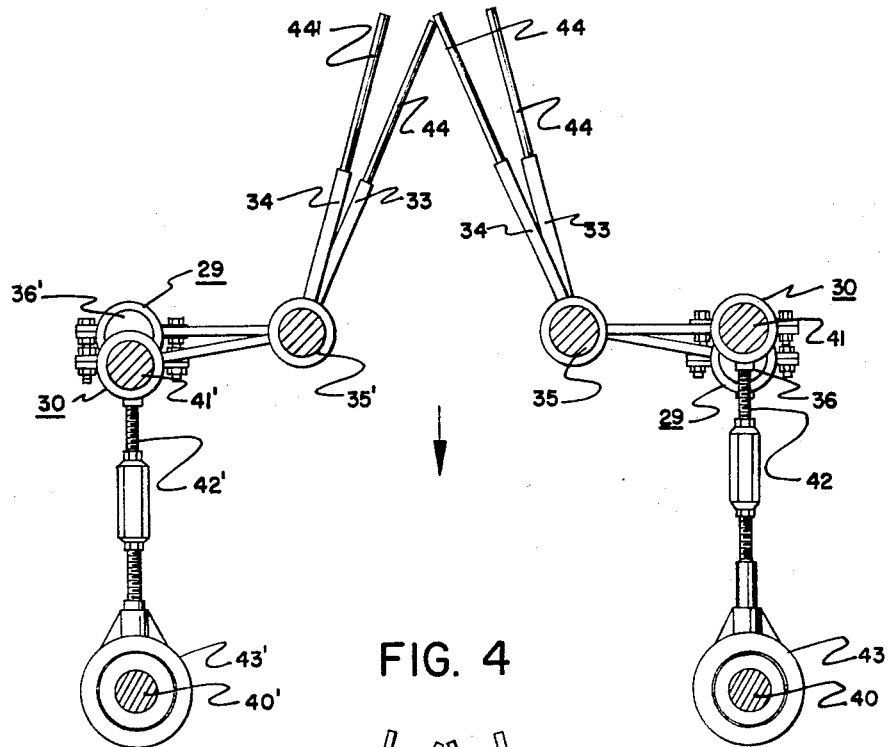
FIG. 4 is a top plan view of the shaker panel assemblies of this invention drawn to a larger scale and taken substantially along the lines 4—4 of the FIG. 3.
Figure 5:
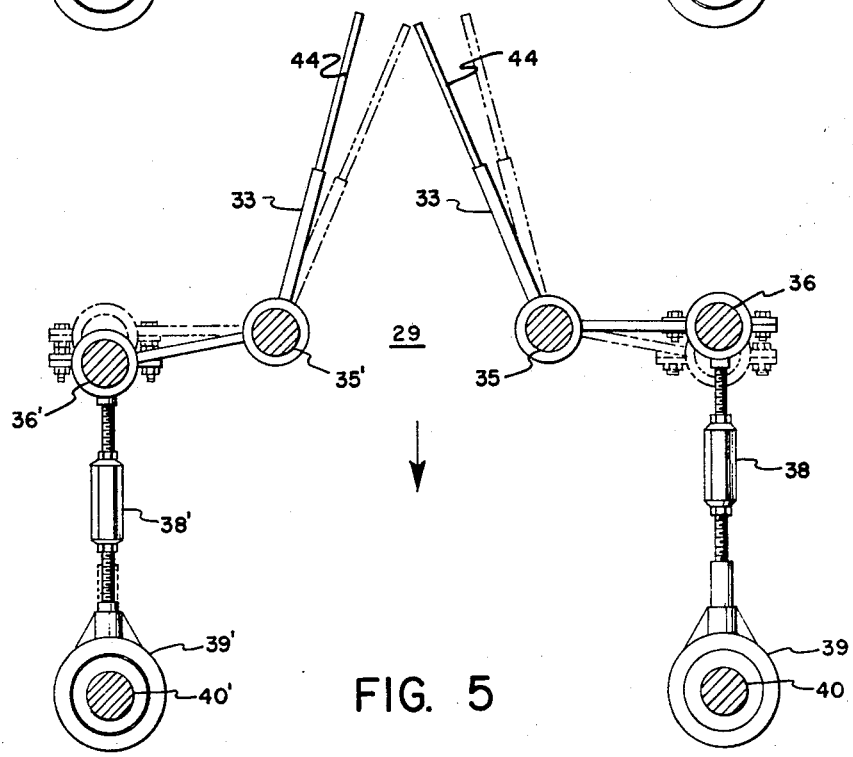
FIG. 5 is a top plan view of one of the shaker panels showing the opposing oscillating position in broken lines for illustrative purposes and taken substantially along the lines 5—5 of FIG. 3.

A multiplicity of vine engaging shaker panel assemblies 29 and 30, one vertically disposed above another, are mounted rearwardly of the guide walls 16 on the framework 12. Referring now more particularly to the FIG. 3, the shaker panel assemblies 29 and 30 are drawn to a larger scale. The assemblies 29 and 30, as shown in the FIG. 3, are viewed toward the direction of travel of the harvester 10 or from the side opposite the FIG. 2. The shaker panel assemblies 29 and 30 are carried by a pair of upstanding opposing frames 31 and 32 suitably fastened to the framework 12 of the harvester 10. Each of the panel assemblies 29 and 30 include a plurality of opposing pairs of substantially L-shaped operating arms 33 and 34 respectively. The arms 33 are journaled for rotation and pivotally carried by the respective fixed shafts 35 and 35' suitably mounted on the respective frames 31 and 32. The shafts 35 and 35' are mounted on the terminal sides of the respective frames 31 and 32 adjacent each other. One of the terminal ends of each of the respective arms 33 is suitably fastened to a respective driven shaft 36 on the frame 31 and a driven shaft 36' on the frame 32. The driven shafts 36 and 36' are carried by respective operating rods 38 and 38' more clearly shown in the FIGS. 4 and 5. The operating rods 38 and 38' have one of their terminal ends suitably fastened to the driven shafts 36 and 36' and their opposite terminal end connected to respective eccentric cam assemblies 39 and 39' journaled for rotation on respective drive shafts 40 and 40', hereinafter later described. The driven shaft 36' is carried by one of the terminal ends of an operating rod 38' connected at its opposite terminal end to an eccentric cam assembly 39' journalled for rotation on a drive shaft 40'. In practice the rods 38 and 38' are rectilinearly orbitally driven by the respective cam assemblies 39 and 39' in response to rotation of the drive shafts 40 and 40'. Therefore, the driven shafts 36 and 36' tend to cause the operating arms 33 of the shaker panel assembly 29 to be pivotally moved on the respective shafts 35 and 35'. It has been found preferable to cause the opposing arms 33 to synchronously move transversely of the harvester in unison in one of two directions so that a vine between the respective arms 33 is moved in response thereto in one direction.

The arms 34 are pivotally carried by the respective fixed shafts 35 and 35' suitably mounted on the respective frames 31 and 32. The shafts 35 and 35' are mounted on the terminal sides of the respective frames 31 and 32 adjacent each other. One of the terminal ends of each of the respective arms 34 is suitably fastened to a respective driven shaft 41 on the frame 31 and a driven shaft 41' on the frame 32. The driven shafts 41 and 41' are carried by respective operating rods 42 and 42' more clearly shown in the FIGS. 4 and 5. The operating rods 42 and 42' have one of their terminal ends suitably fastened to the driven shafts 41 and 41' and their opposite terminal ends connected to respective eccentric cam assemblies 43 and 43' journaled for rotation on respective drive shafts 40 and 40' hereinafter later described. In practice, the rods 42 and 42' are rectilinearly orbitally driven by the respective cam assemblies 43 and 43' in response to rotation of the drive shafts 40 and 40'. Therefore, the driven shafts 41 and 41' tend to cause the operating arms 34 of the shaker panel assembly 30 to be pivotally moved on the respective shafts 35 and 35'. It has been found preferable to cause the opposing arms 34 to synchronously move transversely of the harvester in unison in one of two directions so that a vine between the respective arms 34 is moved in response thereto in one direction. It has been found to advantage to cause the panel assembly 29 including arms 33 to move in one direction and the panel assembly 30 to move concurrently in the direction opposite so that a vine in the panel assemblies 29 and 30 is simultaneously caused to be shaken in two opposing directions to cause fruit to be dislodged from the vine.

Referring again to the FIG. 3, the arms 33 and 34 of the shaker panel assemblies 29 and 30 are each provided with pairs of vine gripping rods 44 suitably fastened to the terminal ends of the arms 33 and 34 opposite the respective driven shafts 36, 36', 41, and 41'. The rods 44 project rearwardly at an angle with respect to the direction of travel of the harvester 10. In operation as the harvester 10 is caused to move along a row of vines to be harvested, the vines tend to be compressed between respective arms as the harvester 10 is forwardly moved. That is to say, as the vines enter the environment of the arms, fruit near the outer portions of the vines are caused to be first dislodged from the vines, and, as the harvester 10 is moved forwardly, fruit disposed more closely to the center of the vine tends to be successively dislodged in response to movement of the respective panels as the vines become more compressed between the opposing rods disposed at a substantially V-shaped angle. Since the vines tend to be held by the rods 44 only the heavier fruit is dislodged, and damage to the vines and foliage may be avoided.

Referring more particularly to the FIG. 1, a power driven shaft 45 provided on framework 12 is suitably connected at one of its terminal ends to a commonly known universal joint connector 46 of a power take-off on the tractor 11. The power driven shaft 45 is suitably connected through a gear box assembly 47 to hydraulic drive pumps 48 and 49 provided on the frame 12. The pump 48 is connected through conduits 50 to a shaker panel assembly hydraulic drive motor 51. The motor 51 is suitably connected through a drive assembly 52 including sprockets and chains to the respective drive shafts 40 and 40'. Similarly the pump 49 is suitably connected to motors and drive assemblies such as 53 on the cross conveyor 23 to operate the several conveyors.

While the harvester 10 of this invention may be self-propelled by any suitable motive means commonly known in the art and include dirigible steering means, the harvester 10 is here shown and described as a towed trailer vehicle connected to a tractor 11 by a drawbar hitch portion 54 provided on the forwardmost portion with respect to the direction of travel of the framework 12. The harvester 10 including the framework 12 is adapted to straddle a row of vines of grapes, berries, and the like to be harvested. In practice it has been found to advantage to mount the drawbar hitch portion 54 at one of the sides of the framework 12 so that the tractor 11 may travel between the rows of vines while the towed harvester 10 is astride the grape vines in the manner herein above described.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A harvester comprising an inverted, substantially U-shaped framework carried by a pair of wheels mounted on respective axles disposed at the opposite terminal sides of said framework; a pair of opposing upstanding guide walls mounted on the forwardmost terminal ends of said framework with respect to a direction of travel of said framework, said guide walls issuing inwardly at an angle and being operable to form a substantially V-shaped passageway; a pair of opposing, rectilinearly extending flexible collector floor portions being coextensive in length with said framework, said floor portions being mounted on the framework adjacent the ground, each of said floor portions issuing upwardly at an angle from the respective opposite terminal sides of said framework toward the centermost portion thereof and being engageable with vines planted in rows; a multiplicity of vine engaging shaker panel assemblies disposed vertically with respect to the ground, one upper panel assembly being carried on said framework vertically above a next preceding lower panel assembly, said one shaker panel assembly moving one portion of a vine being harvested in one direction horizontally transverse to said direction of travel while the next preceding vertically disposed shaker panel assembly move a portion of said vine in a direction opposite to said one direction, each of said shaker panel assemblies including a multiplicity of transversely horizontally opposing pairs of shaker rod assemblies being disposed tangentially at an angle to form a substantially V-shaped passageway, each of said shaker rod assemblies comprising a substantially L-shaped arm having one of the terminal ends of said arm being pivotally mounted to a respective reciprocatingly driven upstanding shaft; each of said arms being reciprocatingly driven forwardly and rearwardly at an angle with respect to the direction of travel of said framework by its respective shaft on said respective upper and lower pairs of opposingly driven panel assemblies; means reciprocatingly driving said shaft; said shaker rod assemblies being journaled for rotation and pivotally carried on an upstanding fixed shaft suitably fastened at its respective terminal opposite ends to said framework aft of said guide walls; said arms being mounted on said fixed shaft by a bracket intermediate the opposite terminal ends of said arms; said shaker panel assemblies uniformly increasing pressure upon a vine in a zone of greater compression as a vine is moved through said substantially V-shaped passageway to dislodge fruit closer to the center of said vine as the harvester slidably moves along rows of vines.

2. The apparatus of claim 1 in which said opposing shaker rod assemblies oscillate transversely in unison.

* * * * *